United States Patent
Seto

(10) Patent No.: US 7,373,443 B2
(45) Date of Patent: May 13, 2008

(54) MULTIPLE INTERFACES IN A STORAGE ENCLOSURE

(75) Inventor: Pak-Lung Seto, Shrewsbury, MA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/551,218

(22) Filed: Oct. 19, 2006

(65) Prior Publication Data

US 2007/0233916 A1  Oct. 4, 2007

Related U.S. Application Data

(62) Division of application No. 10/741,460, filed on Dec. 18, 2003, now Pat. No. 7,155,546.

(51) Int. Cl.
| | |
|---|---|
| *G00F 12/00* | (2006.01) |
| *G06F 13/00* | (2006.01) |
| *G06F 13/42* | (2006.01) |
| *G06F 9/44* | (2006.01) |

(52) U.S. Cl. .................. 710/100; 710/104
(58) Field of Classification Search ............. 710/104, 710/8, 300–304, 62, 74, 100, 14, 315, 305, 710/105; 370/401–402, 351, 466; 711/100; 709/223, 253; 713/100; 361/679, 684, 685
See application file for complete search history.

(56) References Cited

U.S. PATENT DOCUMENTS

| | | | |
|---|---|---|---|
| 5,237,567 A * | 8/1993 | Nay et al. .................. 370/438 |
| 5,692,128 A | 11/1997 | Bolles et al. | |
| 6,333,940 B1 * | 12/2001 | Baydar et al. .............. 370/506 |
| 6,351,375 B1 * | 2/2002 | Hsieh et al. ................ 361/685 |
| 6,532,547 B1 | 3/2003 | Wilcox | |
| 6,853,546 B2 * | 2/2005 | Rabinovitz .................. 361/685 |
| 6,856,508 B2 * | 2/2005 | Rabinovitz .................. 361/685 |
| 6,906,918 B2 * | 6/2005 | Rabinovitz .................. 361/687 |
| 7,093,033 B2 | 8/2006 | Beckett et al. | |
| 7,155,546 B2 * | 12/2006 | Seto .......................... 710/100 |
| 2003/0033477 A1 | 2/2003 | Johnson et al. | |
| 2003/0065686 A1 * | 4/2003 | Callahan et al. ............ 707/200 |
| 2003/0184902 A1 | 10/2003 | Thiesfeld | |
| 2003/0193776 A1 | 10/2003 | Bicknell et al. | |
| 2003/0221061 A1 | 11/2003 | El-Batal et al. | |
| 2004/0010612 A1 | 1/2004 | Pandya | |
| 2005/0251588 A1 | 11/2005 | Hoch et al. | |
| 2007/0067537 A1 | 3/2007 | Seto | |

OTHER PUBLICATIONS

"Extension of PCI bus to 21 slots using GTLP transceiver" by Siegl et al. (abstract only) Publication date Apr. 7-9, 2000.*

(Continued)

*Primary Examiner*—Gopal C. Ray
(74) *Attorney, Agent, or Firm*—Konrad Raynes & Victor LLP; David W. Victor

(57) ABSTRACT

Provided is a method for interfacing with storage units, including a backplane, at least one slot in the storage enclosure for receiving one storage unit, and two physical interfaces on the backplane for at least one slot. The storage unit is capable of being positioned in the slot to mate with one of the two physical interfaces for the slot, wherein each physical interface supports different storage interconnect architectures.

5 Claims, 11 Drawing Sheets

OTHER PUBLICATIONS

PCT/US2004/040138 International Search Report & written opinion mailed Sep. 23, 2005.*
US Office Action, mailed May 10, 2007, for U.S. Appl. No. 10/742,030.
US Office Action, mailed Jun. 29, 2007, for U.S. Appl. No. 10/742,029.
US Office Action, mailed May 17, 2007, for U.S. Appl. No. 11/551,215.
US Final Office Action, mailed May 8, 2006, for U.S. Appl. No. 10/741,460.
US Office Action, mailed Dec. 30, 2005, for U.S. Appl. No. 10/741,460.

* cited by examiner

MULTIPLE INTERFACES IN A STORAGE ENCLOSURE

CROSS REFERENCE TO RELATED APPLICATIONS

This application is a divisional of U.S. patent application Ser. No. 10/741,460 filed on Dec. 18, 2003, which patent application is incorporated herein in its entirety.

BACKGROUND

1. Field

The present embodiments relate to a method, system, and program for supporting multiple interfaces in a storage enclosure.

2. Description of the Related Art

An adaptor or multi-channel protocol controller enables a device coupled to the adaptor to communicate with one or more connected end devices according to a storage interconnect architecture, also known as a hardware interface, where a storage interconnect architecture defines a standard way to communicate and recognize such communications, such as Serial Attached Small Computer System Interface (SCSI) (SAS), Serial Advanced Technology Attachment (SATA), Fibre Channel, etc. These storage interconnect architectures allow a device to maintain one or more connections to another end device via a point-to-point connection, an arbitrated loop of devices, an expander providing a connection to further end devices, or a fabric comprising interconnected switches providing connections to multiple end devices. In the SAS/SATA architecture, a SAS port is comprised of one or more SAS PHYs, where each SAS PHY interfaces a physical layer, i.e., the physical interface or connection, and a SAS link layer having multiple protocol link layer. Communications from the SAS PHYs in a port are processed by the transport layers for that port. There is one transport layer for each SAS port to interface with each type of application layer supported by the port. A "PHY" as defined in the SAS protocol is a device object that is used to interface to other devices and a physical interface. Further details on the SAS architecture for devices and expanders is described in the technology specification "Information Technology—Serial Attached SCSI (SAS)", reference no. ISO/IEC 14776-150:200x and ANSI INCITS.***:200xPHY layer (Jul. 9, 2003), published by ANSI; details on the Fibre Channel architecture are described in the technology specification "Fibre Channel Framing and Signaling Interface", document no. ISO/IEC AWI 14165-25; details on the SATA architecture are described in the technology specification "Serial ATA: High Speed Serialized AT Attachment" Rev. 1.0A (January 2003).

Within an adaptor, the PHY layer performs the serial to parallel conversion of data, so that parallel data is transmitted to layers above the PHY layer, and serial data is transmitted from the PHY layer through the physical interface to the PHY layer of a receiving device. In the SAS specification, there is one set of link layers for each SAS PHY layer, so that effectively each link layer protocol engine is coupled to a parallel-to-serial converter in the PHY layer. A connection path connects to a port coupled to each PHY layer in the adaptor and terminate in a physical interface within another device or on an expander device, where the connection path may comprise a cable or etched paths on a printed circuit board.

An expander is a device that facilitates communication and provides for routing among multiple SAS devices, where multiple SAS devices and additional expanders connect to the ports on the expander, where each port has one or more SAS PHYs and corresponding physical interfaces. The expander also extends the distance of the connection between SAS devices. The expander may route information from a device connecting to a SAS PHY on the expander to another SAS device connecting to the expander PHYs. In SAS, using the expander requires additional serial to parallel conversions in the PHY layers of the expander ports. Upon receiving a frame, a serial-to-parallel converter, which may be part of the PHY, converts the received data from serial to parallel to route internally to an output SAS PHY, which converts the frame from parallel to serial to the target device. The SAS PHY may convert parallel data to serial data through one or more encoders and convert serial data to parallel data through a parallel data builder and one or more decoders. A phased lock loop (PLL) may be used to track incoming serial data and lock into the frequency and phase of the signal. This tracking of the signal may introduce noise and error into the signal.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Supporting Multiple Storage Interconnect Architectures in an Adaptor

Figure 1:
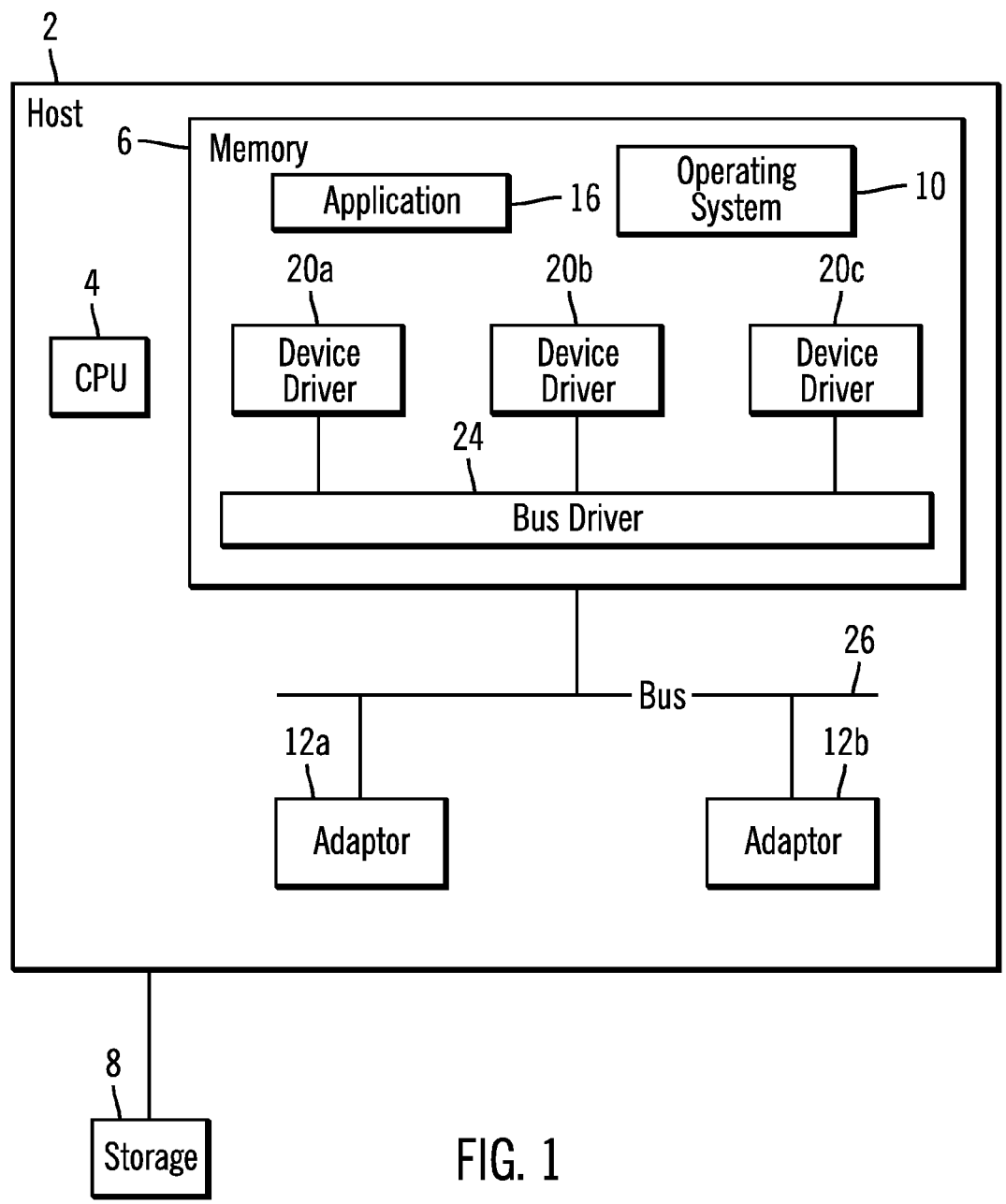
FIGS. 1 and 2 illustrate a system and adaptor in accordance with embodiments.

FIG. 1 illustrates a computing environment in which embodiments may be implemented. A host system 2 includes one or more central processing units (CPU) 4 (only one is shown), a volatile memory 6, non-volatile storage 8, an operating system 10, and one or more adaptors 12a, 12b which maintains physical interfaces to connect with other end devices directly in a point-to-point connection or indirectly through one or more expanders, one or more switches in a fabric or one or more devices in an arbitrated loop. An application program 16 further executes in memory 6 and is capable of transmitting to and receiving information from the target device through one of the physical interfaces in the adaptors 12a, 12b. The host 2 may comprise any computing device known in the art, such as a mainframe, server, personal computer, workstation, laptop, handheld computer, telephony device, network appliance, virtualization device, storage controller, etc. Various CPUs 4 and operating system 10 known in the art may be used. Programs and data in memory 6 may be swapped into storage 8 as part of memory management operations.

The operating system 10 may load a device driver 20a, 20b, 20c for each protocol supported in the adaptor 12a, 12b to enable communication with a device communicating using the supported protocol and also load a bus driver 24, such as a Peripheral Component Interconnect (PCI) interface, to enable communication with a bus 26. Further details of PCI interface are described in the publication "PCI Local Bus, Rev. 2.3", published by the PCI-SIG. The operating system 10 may load device drivers 20a, 20b, 20c supported by the adaptors 12a, 12b upon detecting the presence of the adaptors 12a, 12b, which may occur during initialization or dynamically, such as the case with plug-and-play device initialization. In the embodiment of FIG. 1, the operating system 10 loads three protocol device drivers 20a, 20b, 20c. For instance, the device drivers 20a, 20b, 20c may support the SAS, SATA, and Fibre Channel point-to-point storage interfaces, i.e., interconnect architectures. Additional or fewer device drivers may be loaded based on the number of device drivers the adaptor 12 supports.

Figure 2:
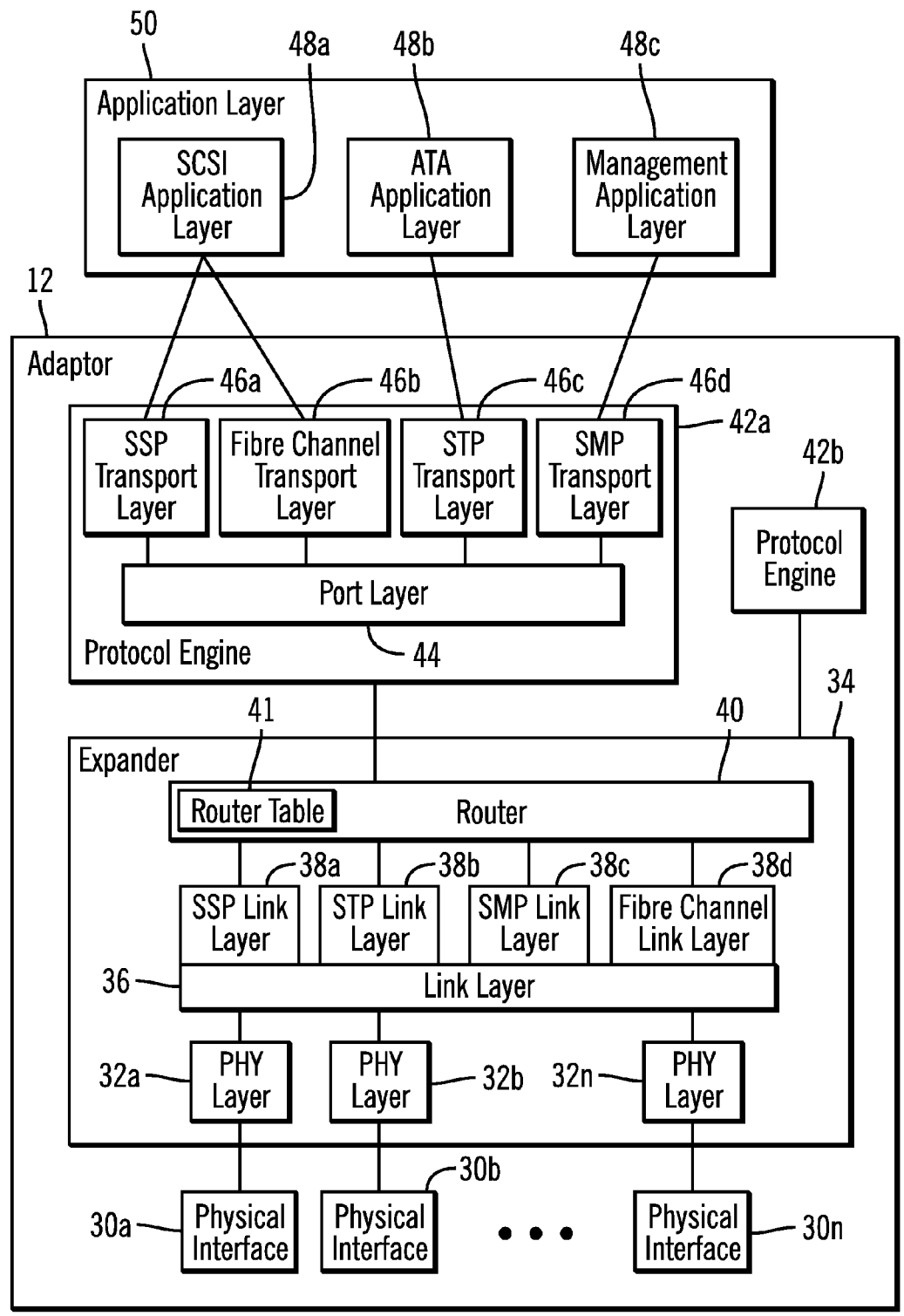

FIG. 2 illustrates an embodiment of adaptor 12, which may comprise the adaptors 12a, 12b. Each adaptor includes a plurality of physical interfaces 30a, 30b . . . 30n, which may include the transmitter and receiver circuitry and other connection hardware. The physical interface may connect to another device via cables or a path etched on a printed circuit board so that devices on the printed circuit board communicate via etched paths. The physical interfaces 30a, 30b . . . 30n may provide different physical interfaces for different device connections, such as one physical interface 30a, 30b . . . 30n for connecting to a SAS/SATA device and another interface for a Fibre Channel device. Each physical interface 30a, 30b . . . 30n may be coupled to a PHY layer 32a, 32b . . . 32n within expander 34. The PHY layer 32a, 32b . . . 32n provides for an encoding scheme, such as 8b 10b, to translate bits, and a clocking mechanism, such as a phased lock loop (PLL). The PHY layer 32a, 32b . . . 32n would include a serial-to-parallel converter to perform the serial-to-parallel conversion and the PLL to track the incoming data and provide the data clock of the incoming data to the serial-to-parallel converter to use when performing the conversion. Data is received at the adaptor 12 in a serial format, and is converted at the SAS PHY layer 32a, 32b . . . 32n to the parallel format for transmission within the adaptor 12. The SAS PHY layer 32a, 32b . . . 32n further provides for error detection, bit shift and amplitude reduction, and the out-of-band (OOB) signaling to establish an operational link with another SAS PHY in another device. The term interface may refer to the physical interface or the interface performing operations on the received data implemented as circuitry, or both.

The PHY layer 32a, 32b . . . 32n further performs the speed negotiation with the PHY in the external device transmitting data to adaptor 12. In certain embodiments, the PHY layer 32a, 32b . . . 32n may be programmed to allow speed negotiation and detection of different protocols transmitting at the same or different transmission speeds. For instance, SATA and SAS transmissions can be detected because they are transmitted at speeds of 1.5 gigahertz (GHz) and 3 GHz and Fibre Channel transmissions can be detected because they are transmitted at 1.0625 GHz, 2.125 GHz, and 4.25 GHz. Because link transmission speeds may be different for certain storage interfaces, the PHY layer 32a, 32b . . . 32n may detect storage interfaces having different link speeds by maintaining information on speeds for different storage interfaces. However, certain different storage interfaces, such as SAS and SATA, may transmit at the same link speeds and support common transport protocols. If storage interfaces transmit at a same link speed, then the PHY layer 32a, 32b . . . 32n may distinguish among storage interfaces capable of transmitting at the same speed by checking the transmission format to determine the storage interface and protocol, where the link protocol defines the characteristics of the transmission, including speed and transmission data format.

For instance, the SAS and SATA protocol can be distinguished not only by their transmission speeds, but also by their use of the OOB signal. Other protocols, such as Fibre Channel do not use the OOB signal. Fibre Channel, SAS and SATA all have a four byte primitive. The primitive of SATA can be distinguished because the first byte of the SATA primitive indicates "K28.3", whereas the first byte of the SAS and Fibre Channel primitive indicates "K28.5". The SAS and Fibre Channel primitives can be distinguished based on the content of the next three bytes of their primitives, which differ. Thus, the content of the primitives can be used to distinguish between the SAS, SATA and Fibre Channel protocols. Additionally, different of the protocols, such as SAS and Fibre Channel have different handshaking protocols. Thus, the handshaking protocol being used by the device transmitting the information can be used to distinguish the storage connect interface being used.

The PHY layer 32a, 32b . . . 32n forwards the frame to the link layer 36 in the expander 34. The link layer 36 may maintain a set of elements for each protocol supported by a port, such as a Serial SCSI Protocol (SSP) link layer 38 to process SSP frames, a Serial Tunneling Protocol (STP) layer 38b, a Serial Management Protocol (SMP) layer 38c, and a Fibre Channel link layer 38d to support the Fibre Channel protocol for transporting the frames. Within the expander 34, information is routed from one PHY to another. The transmitted information may include primitives, packets, frames, etc., and may be used to establish the connection and open the address frame. A router 40 routes transmissions between the protocol engines 42a, 42b and the PHY layers 32a, 32b . . . 32n. The router 40 maintains a router table 41 providing an association of PHY layers 32a, 32b . . . 32n to protocol engines 42a, 42b, such that a transmission from a PHY layer or protocol engine is routed to the corresponding protocol engine or PHY layer, respectively, indicated in the router table 41. If the protocol engines 42a, 42b support the transport protocol, e.g., SSP, STP, SMP, Fibre Channel protocol, etc., associated with the link layer 38a, 38b, 83c, 38d forwarding the transmission, then the router 40 may use any technique known in the art to select among the multiple protocol engines 42a, 42b to process the transmission, such as round robin, load balancing based on protocol engine 42a, 42b utilization, etc. The Fibre Channel Protocol comprises the transport layer for handling information transmitted on a Fibre Channel storage interface. Data may be communicated in frames, packets, primitives or any other data transmission format known in the art. A transport layer comprises any circuitry, including software or hardware, that is use to provide a virtual error-free, point to point connection to allow for the transmission of information between devices so that transmitted information arrives un-corrupted and in the correct order. The transport layer further establishes, e.g., opens, and dissolves connections between devices.

A transport protocol provides a set of transmission rules and handshaking procedures used to implement a transport layer, often defined by an industry standard, such as SAS, SATA, Fibre Channel, etc. The transport layer and protocol may comprise those transport protocols described herein and others known in the art. The protocol engine 42a, 42b comprises the hardware and/or software that implements different transport protocols to provide transport layer functionality for different protocols.

Each protocol engine 42a, 42b is capable of performing protocol related operations for all the protocols supported by the adaptor 12. Alternatively, different protocol engines may support different protocols. For instance, protocol engine 42b may support the same transport layers as protocol engine 42a or a different set of transport layers. Each protocol engine 42a, 42b implements a port layer 44, and a transport layer, such as a SSP transport layer 46a, STP transport layer 46b, SMP transport layer 46c, and a Fibre Channel Protocol transport layer 46d. Further, the protocol engines 30a, 30b may support the transport and network layer related operations for the supported protocols. The port layer 44 interfaces between the link layers 38a, 38b, 38c, 38d via the router 40 and the transport layers 46a, 46b, 46c, 46d to transmit information to the correct transport layer or link layer. The PHYs 32a, 32b . . . 32n and corresponding physical interfaces 30a, 30b . . . 30n may be organized into one or more ports, where each SAS port has a unique SAS address. The port comprises a component or construct to which interfaces are assigned. An address comprises any identifier used to identify a device or component. The protocol engines 42a, 42b may further include one or more virtual PHY layers to enable communication with virtual PHY layers in the router 40. A virtual PHY is an internal PHY that connects to another PHY inside of the device, and not to an external PHY. Data transmitted to the virtual PHY typically does not need to go through a serial-to-parallel conversion.

Each protocol engine 42a, 42b includes an instance of the protocol transport layers 46a, 46b, 46c, 46d, where there is one transport layer to interface with each type of application layer 48a, 48b, 48c in the application layer 50. The application layer 50 may be supported in the adaptor 12 or host system 2 and provides network services to the end users. For instance, the SSP transport layer 46a and Fibre Channel Protocol (FCP) transport layer 46b interface with a SCSI application layer 48a, the STP transport layer 46c interfaces with an Advanced Technology Attachment (ATA) application layer 48b, and the SMP transport layer 46d interfaces with a management application layer 48c. Further details of the ATA technology are described in the publication "Information Technology-AT Attachment with Packet Interface-6 (ATA/ATAPI-6)", reference no. ANSI INCITS 361-2002 (September, 2002).

All the PHY layers 32a, 32b . . . 32n may share the same link layer and protocol link layers, or there may be a separate instance of each link layer and link layer protocol 38a, 38b, 38c, 38d for each PHY. Further, each protocol engine 42a, 42b may include one port layer 44 for all ports including the PHY layers 32a, 32b . . . 32n or may include a separate instance of the port layer 44 for each port in which one or more PHY layers and the corresponding physical interfaces are organized. Further details on the operations of the physical layer, PHY layer, link layer, port layer, transport layer, and application layer and components implementing such layers described herein are found in the technology specification "Information Technology—Serial Attached SCSI (SAS)", referenced above.

The router 40 allows the protocol engines 42a, 42b to communicate to any of the PHY layers 32a, 32b . . . 32n. The protocol engines 42a, 42b communicate parallel data to the PHY layers 32a, 32b . . . 32n, which include parallel-to-serial converters to convert the parallel data to serial data for transmittal through the corresponding physical interface 30a, 30b . . . 30n. The data may be communicated to a PHY on the target device or an intervening external expander. A target device is a device to which information is transmitted from a source or initiator device attempting to communicate with the target device.

With the described embodiments of FIGS. 1 and 2, one protocol engine 42a, 42b having the port and transport layers can manage transmissions to multiple PHY layers 32a, 32b . . . 32n. The transport layers 46a, 46b, 46c, 46d of the protocol engines 42a, 42b may only engage with one open connection at a time. However, if delays are experienced from the target on one open connection, the protocol engine 42a, 42b can disconnect and establish another connect to process I/O requests from that other connection to avoid latency delays for those target devices trying to establish a connection. This embodiment provides greater utilization of the protocol engine bandwidth by allowing each protocol engine to multiplex among multiple target devices and switch among connections. The protocol engines 42a, 42b and physical interface have greater bandwidth than the target device, so that the target device throughput is lower than the protocol engine 42a, 42b throughput. In certain embodiments, the protocol engines 42a, 42b may multiplex between different PHYs 32a, 32b . . . 32n to manage multiple targets.

Allowing one protocol engine to handle multiple targets further reduces the number of protocol engines that need to be implemented in the adaptor to support all the targets.

Figure 3:
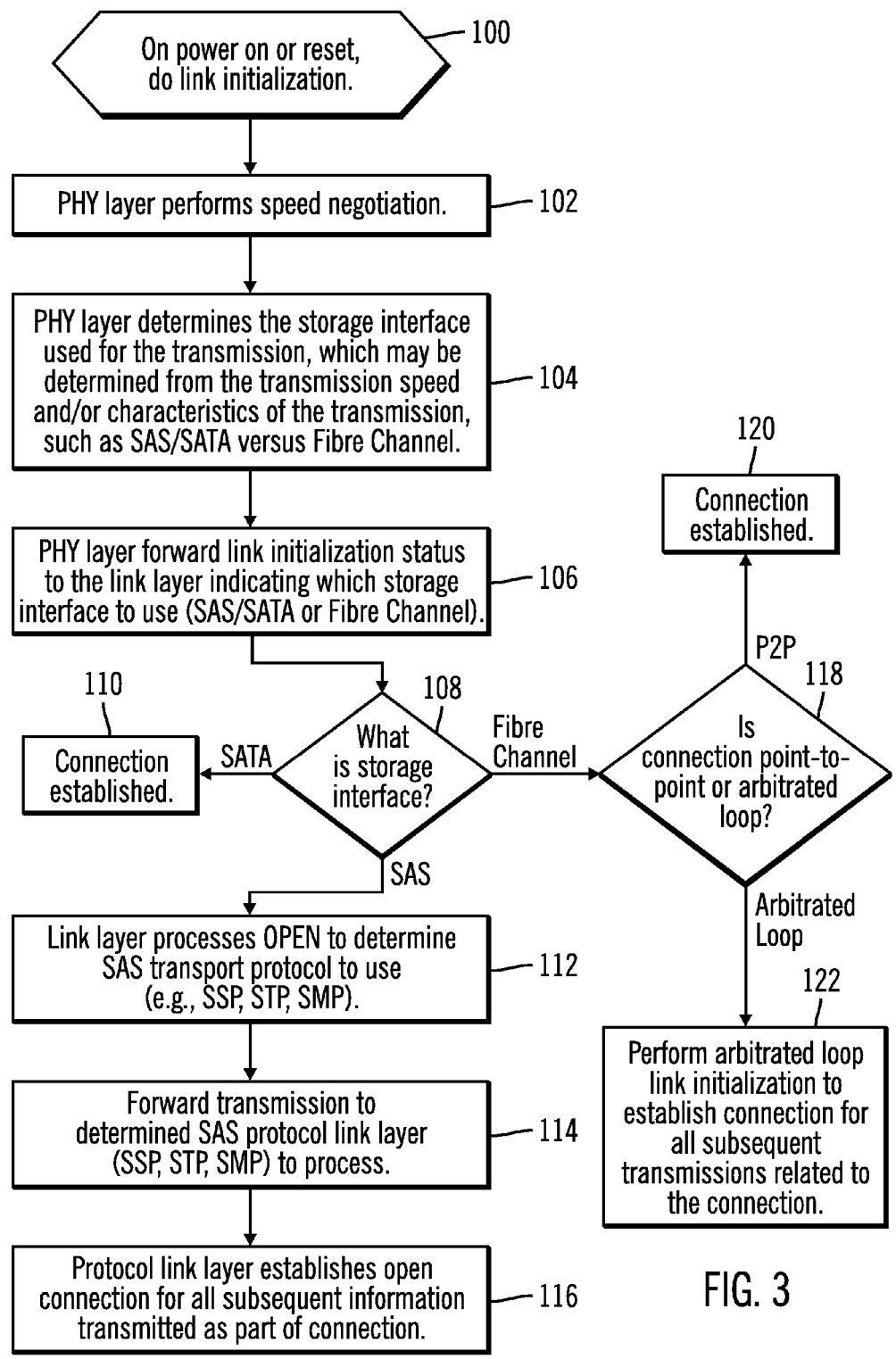
FIGS. 3, 4, and 5 illustrate operations implemented in the adaptor of FIGS. 1 and 2.

FIG. 3 illustrates operations performed by the PHY layers 32a, 32b . . . 32n and the link layer 36 to open a connection with an initiating device, where the initiating device may transmit using SAS, Fibre Channel, or some other storage interface (storage interconnect architecture). The operation to establish the connection may occur after the devices are discovered during identification and link initialization. In response to a reset or power-on sequence, the PHY layer 32a, 32b may begin (at block 100) link initialization by receiving link initialization information, such as primitives, from an initiator device at one physical interface 30a, 30b . . . 30n (FIG. 2). The PHY layer 32a, 32b . . . 32n coupled to the receiving physical interface 30a, 30b . . . 30n performs (at block 102) speed negotiation to ensure that the link operates at the highest frequency. In certain embodiments, the PHY layer 32a, 32b . . . 32n includes the capability to detect and negotiate speeds for different storage interfaces, where the different storage interfaces have different transmission characteristics, such as different transmission speeds and/or transmission information, such as is the case with the SAS/SATA and Fibre Channel storage interfaces. The PHY layer 32a, 32b . . . 32n then determines (at block 104) the storage interface used for the transmission to establish the connection, which may be determined from the transmission speed if a unique transmission speed is associated with a storage interface or from characteristics of the transmission, such as information in the header of the transmission, format of the transmission, etc. The PHY layer 32a, 32b forwards (at block 106) the information to the link layer 36 indicating which detected storage interface to use (SAS/SATA or Fibre Channel).

If (at block 108) the determined storage interface complies with the SATA protocol, then the connection is established (at block 110) and no further action is necessary. If (at block 108) the connection utilizes the SAS protocol, then the link layer 36 processes (at block 112) an OPEN frame to determine the SAS transport protocol to use (e.g., SSP, STP, SMP, Fibre Channel Protocol). The OPEN frame is then forwarded (at block 114) to the determined SAS protocol link layer 38a, 38b, 38c, 38d (SSP, STP,SMP, Fibre Channel Protocol) to process. The protocol link layer 38a, 38b, 38c, 38d then establishes (at block 116) an open connection for all subsequent frames transmitted as part of that opened connection. The connection must be opened using the OPEN frame between an initiator and target port before communication may begin. A connection is established between one SAS initiator PHY in the SAS initiator port and one SAS target PHY in the SAS target port. If (at blocks 108 and 118) the storage interface complies with a point-to-point Fibre Channel protocol, then the connection is established (at block 120). Otherwise, if (at blocks 108 and 118) the storage interface complies with the Fibre Channel Arbitrated Loop protocol, then the Fibre Channel link layer 38d establishes (at block 122) the open connection for all subsequent frames transmitted as part of connection. The Fibre Channel link layer 38d may establish the connection using Fibre Channel open primitives. Further details of the Fibre Channel Arbitrated Loop protocol are described in the publication "Information Technology-Fibre Channel Arbitrated Loop (FC-AL-2)", having document no. ANSI INCITS 332-1999.

With the described implementations, the PHY layer 32a, 32b . . . 32n is able to determine the storage interface for different storage interfaces that transmit at different transmission link speeds and/or have different transmission characteristics. This determined storage interface information is then forwarded to the link layer 36 to use to determine which link layer protocol and transport protocol to use to establish the connection, such as a SAS link layer protocol, e.g., 38a, 38b, 38c, or the Fibre Channel link layer protocol 38d, where the different protocols that may be used require different processing to handle.

Figure 4:
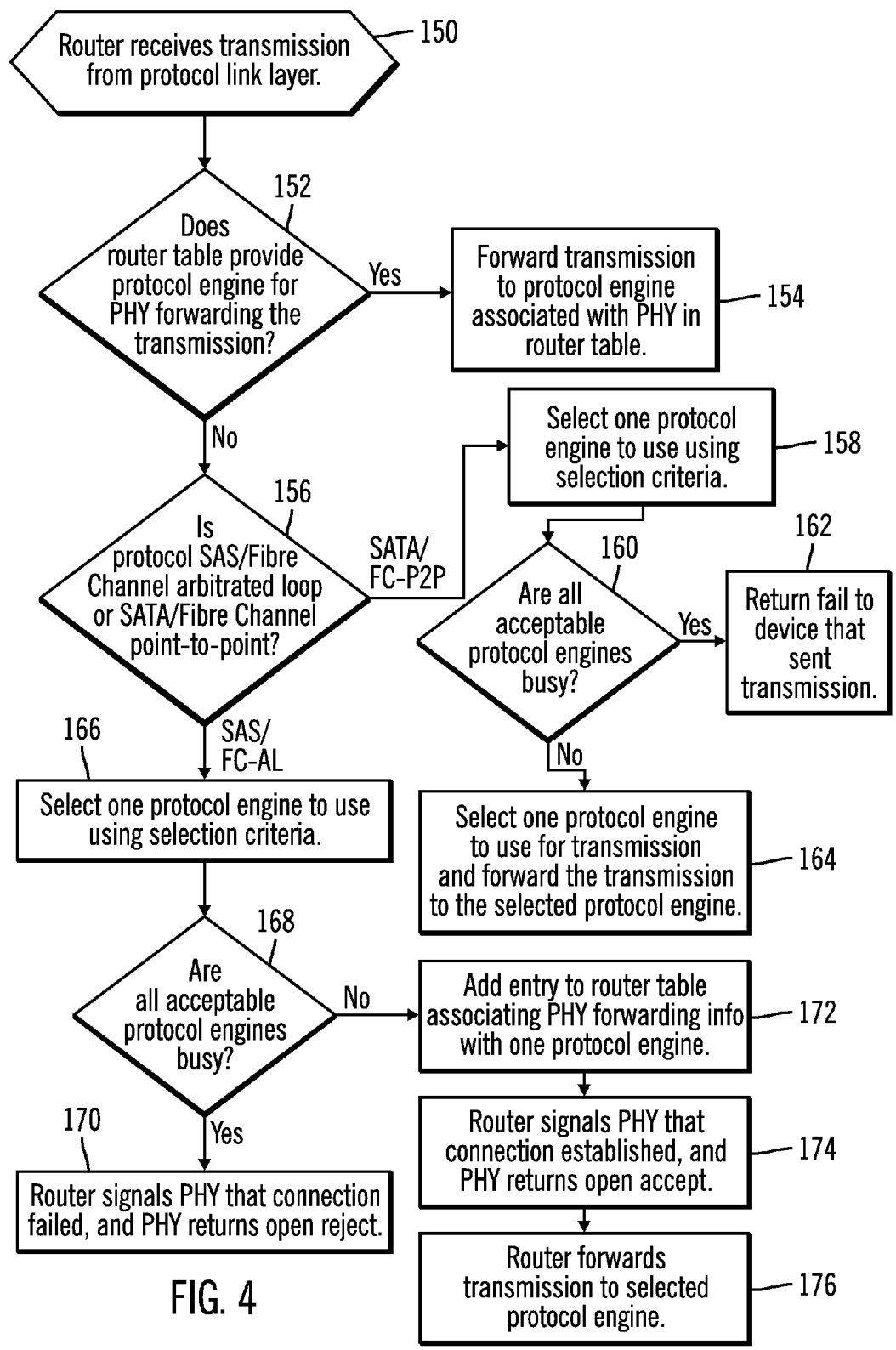

FIG. 4 illustrates operations performed by the router 40 to select a protocol engine 42a, 42b to process the received frame. Upon receiving (at block 150) a transmission from the protocol link layer 38a, 38b, 38c, 38d, such as a frame, packet, primitive, etc., to establish a connection, if (at block 152) a router table 41 provides an association of a protocol engine 42a, 42b for the PHY 32a, 32b . . . 32n forwarding the transmission, then the router 40 forwards (at block 154) the transmission to the protocol engine 42a, 42b associated with the PHY indicated in the router table 41. If (at block 152) the router table 41 does not provide an association of a PHY layer and protocol engine and if (at block 156) the protocol of the transmission complies with the SATA or Fibre Channel point-to-point protocol, then the router 40 selects (at block 158) one protocol engine to use based on a selection criteria, such as load balancing, round robin, etc. If (at block 160) all protocol engines 46a, 46b capable of handling the determined protocol are busy, then fail is returned (at block 162) to the device that sent a transmission. Otherwise, if (at block 160) a protocol engine 46a, 46b is available, then one protocol engine 46a, 46b is selected (at block 164) to use for the transmission and the transmission is forwarded to the selected protocol engine.

If (at block 156) the protocol of the connection request complies with the SAS or Fibre Channel Arbitrated Loop protocol, then the router 40 selects (at block 166) one protocol engine 46a, 46b to use based on a selection criteria. If (at block 168) all protocol engines 46a, 46b capable of handling the determined protocol are busy, then the PHY receiving the transmission is signaled that the connection request failed, and the PHY 32a, 32b . . . 32n returns (at block 170) an OPEN reject command to the transmitting device. Otherwise, if (at block 168) a protocol engine 46a, 46b is available, then an entry is added (at block 172) to the router table 41 associating the PHY 42a, 42b . . . 42n forwarding the transmission with one protocol engine 46a, 46b. The router 40 signals (at block 174) the PHY that the connection is established, and the PHY returns OPEN accept. The router 40 forwards (at block 176) the transmission to the selected protocol engine 46a, 46b.

Additionally, the application layer 50 may open a connection to transmit information to a target device by communicating the open request frames to one protocol engine 42a, 42b, using load balancing or some other selecting technique, where the protocol engine 42a, 42b transport and port layers transmit the open connection frames to the router 40 to direct the link initialization to the appropriate link layer and PHY layer.

Figure 5:
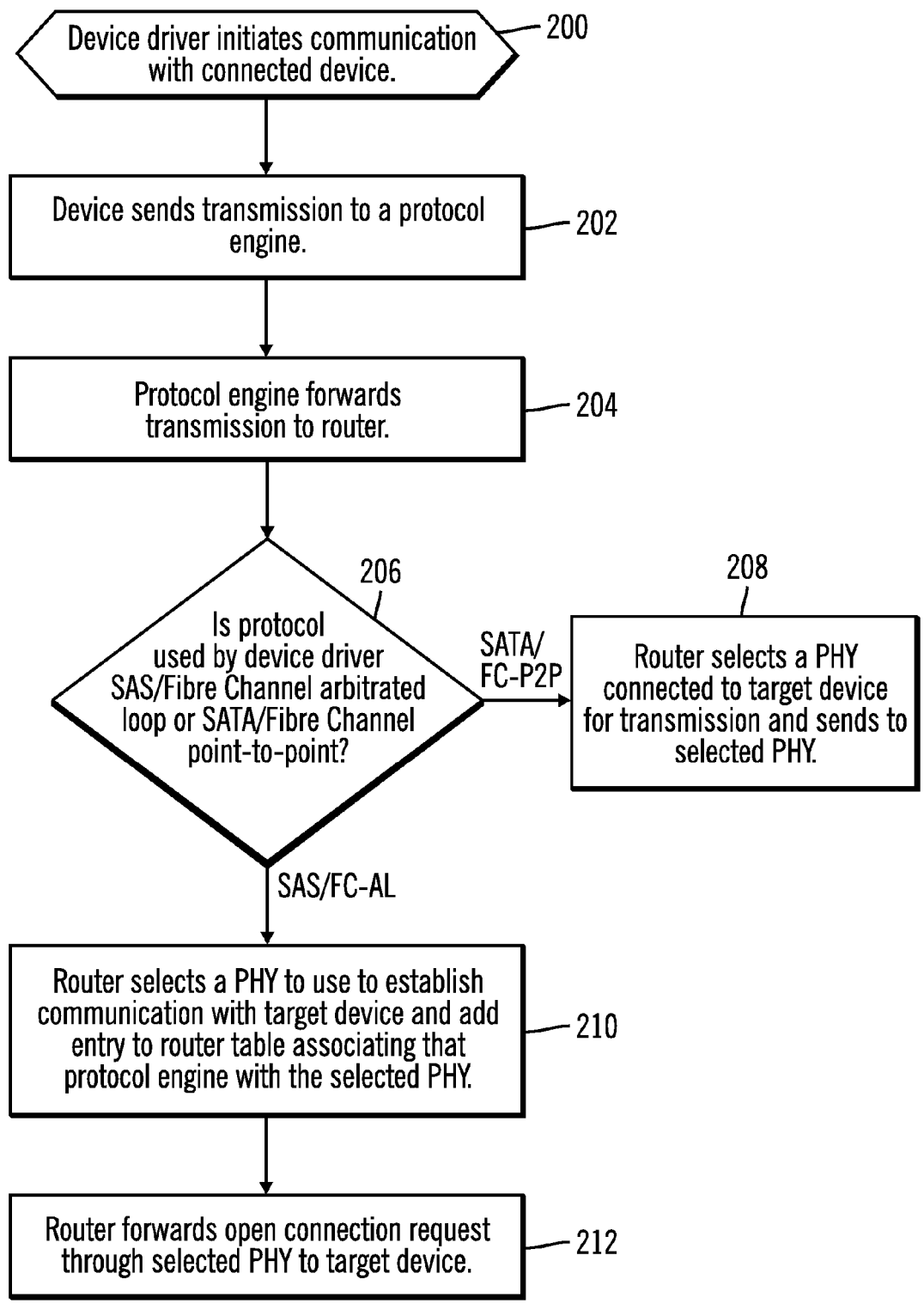

FIG. 5 illustrates operations performed in the adaptor 12 to enable a device driver 20a, 20b, 20c to communicate information to a target device through an adaptor 12a, 12b (FIG. 1). At block 200, a device driver 20a, 20b, 20c transmits information to initiate communication with a connected device by sending (at block 202) information to a protocol engine 46a, 46b. A device driver 20a, 20b, 20c may perform any operation to select a protocol engine to use. The protocol engine 46a, 46b receiving the transmission forwards (at block 204) the transmission to the router 40. If (at block 206) the protocol used by the device driver 20a, 20b, 20c is SATA or Fibre Channel point-to-point protocol, then the router 40 selects (at block 208) a PHY 32a, 32b . . . 32n connected to the target device (directly or indirectly through one or more expanders or a fabric) for transmission and sends the transmission to the selected PHY. If (at block 206) the protocol used by the device driver 20a, 20b, 20c initiating the transmission is SAS or Fibre Channel Arbitrated Loop, then the router 40 selects (at block 210) a PHY 32a, 32b . . . 32n to use to establish communication with the target device and add an entry to the router table associating the protocol engine 42a, 42b forwarding the transmission with the selected PHY, so that the indicated protocol engine and PHY are used for communications through that SAS or Fibre Channel Arbitrated Loop connection. The router 40 then forwards (at block 212) the open connection request through the selected PHY 32a, 32b . . . 32n to the target device.

Described embodiments provide techniques for allowing connections with different storage interfaces that communicate at different transmission speeds and/or different transmission characteristics. In this way, a single adaptor 12 may provide multiple connections for different storage interfaces (storage interconnect architectures) that communicate using different transmission characteristics, such as transmitting at different link speeds or including different protocol information in the transmissions. For instance, the adaptor 12 may be included in an enclosure that is connected to multiple storage devices on a rack or provides the connections for storage devices within the same enclosure.

Still further, with the described embodiments, there may be only one serial to parallel conversion between the PHY layers 32a, 32b . . . 32n performing parallel-to-serial conversion and the protocol engines 42a, 42b within the adaptor. In implementations where the expander is located external to the adaptor, three parallel-to-serial conversions may be performed to communicate data from the connections to the router (serial to parallel), from the router in the expander to the adaptor (parallel to serial), and at the adaptor from the connection to the protocol engine (serial to parallel). Certain described embodiments eliminate the need for two of these conversions by allowing the parallel data to be transmitted directly from the router to the protocol engines in the same adaptor component. Reducing the number of parallel to serial conversions and corresponding PLL tracking reduces data and bit errors that may be introduced by the frequency changes produced by the PLL in the converters and may reduce latency delays caused by such additional conversions.

Enclosure Architecture Supporting Multiple Protocols

Figure 6:
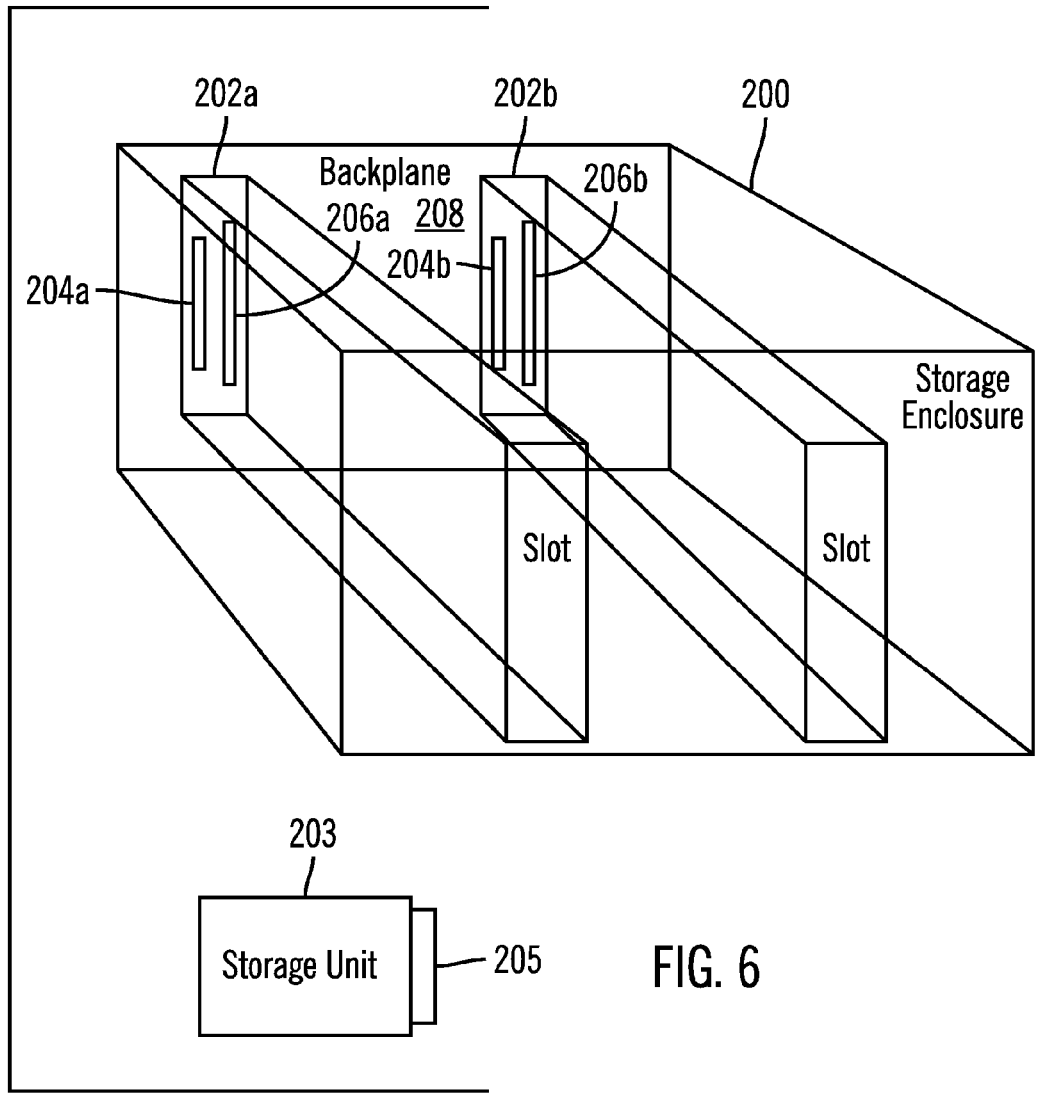
FIG. 6 illustrates a perspective view of a storage enclosure in accordance with embodiments.

FIG. 6 illustrates a storage enclosure 200 having a plurality of slots 202a and 202b in which storage units 203 may be inserted. The storage unit may comprise a removable disk, such as a magnetic hard disk drive, tape cassette, optical disk, solid state disk, etc., may be inserted. Although only two slots are shown, any number of slots may be included in the storage enclosure 200. The storage unit has a connector 205 to mate with one of the physical interfaces 204a, 206a and 204b, 206b on a backplane 208 of the enclosure 200 through one of the slots 202a, 202b, respectively. A backplane comprises a circuit board including connectors, interfaces, slots into which components are plugged. The slot 252a, 252b, 252c comprises the space for receiving the storage unit 203 and may be delineated by a physical structure or boundaries, such as walls, guides, etc., or may comprise a space occupied by the storage unit 203 that is not defined by any physical structures or boundaries. The physical interfaces 204a, 206a and 204b, 206b correspond to the physical interfaces 30a, 30b . . . 30n in the adaptor. For instance, if the storage unit 203 is capable of mating with physical interface 204a, 204b, then the user may rotate the storage unit 203 to allow the storage unit 203 to mate with that particular physical interface 204a, 204b. If the storage unit 203 is capable of mating with physical interface 206a, 206b, then the user may rotate the storage unit 203 assembly 180 degrees to mate with physical interfaces 206a, 206b. In this way a single slot provides interfaces for storage units whose physical interfaces have different physical configurations, such as a different size dimensions, different interface sizes, and different pin interconnect arrangements.

For instance, in certain embodiments, the physical interfaces 206a and 206b may be capable of mating with a SATA/SAS physical interface and the physical interfaces 204a and 204b may be capable of mating with a Fibre Channel physical interface. In this way a single slot 202a, 202b allows mating with the storage unit having physical interfaces having different physical configurations. For instance, if the storage unit 203 interface was designed to plug into a SAS/SATA interface, then the user would rotate the storage unit 203 to interface with the physical interface, e.g., 204a, supporting that interface, whereas if the storage interface was designed to plug into a Fibre Channel interface, then the user would rotate the storage unit 203 to interface with the supporting physical interface, e.g., 206a.

In certain embodiments, the storage unit 203 may include only one physical interface to mate with one physical interface, e.g., 204a, 206a in one slot, e.g., 202a.

Figure 7:
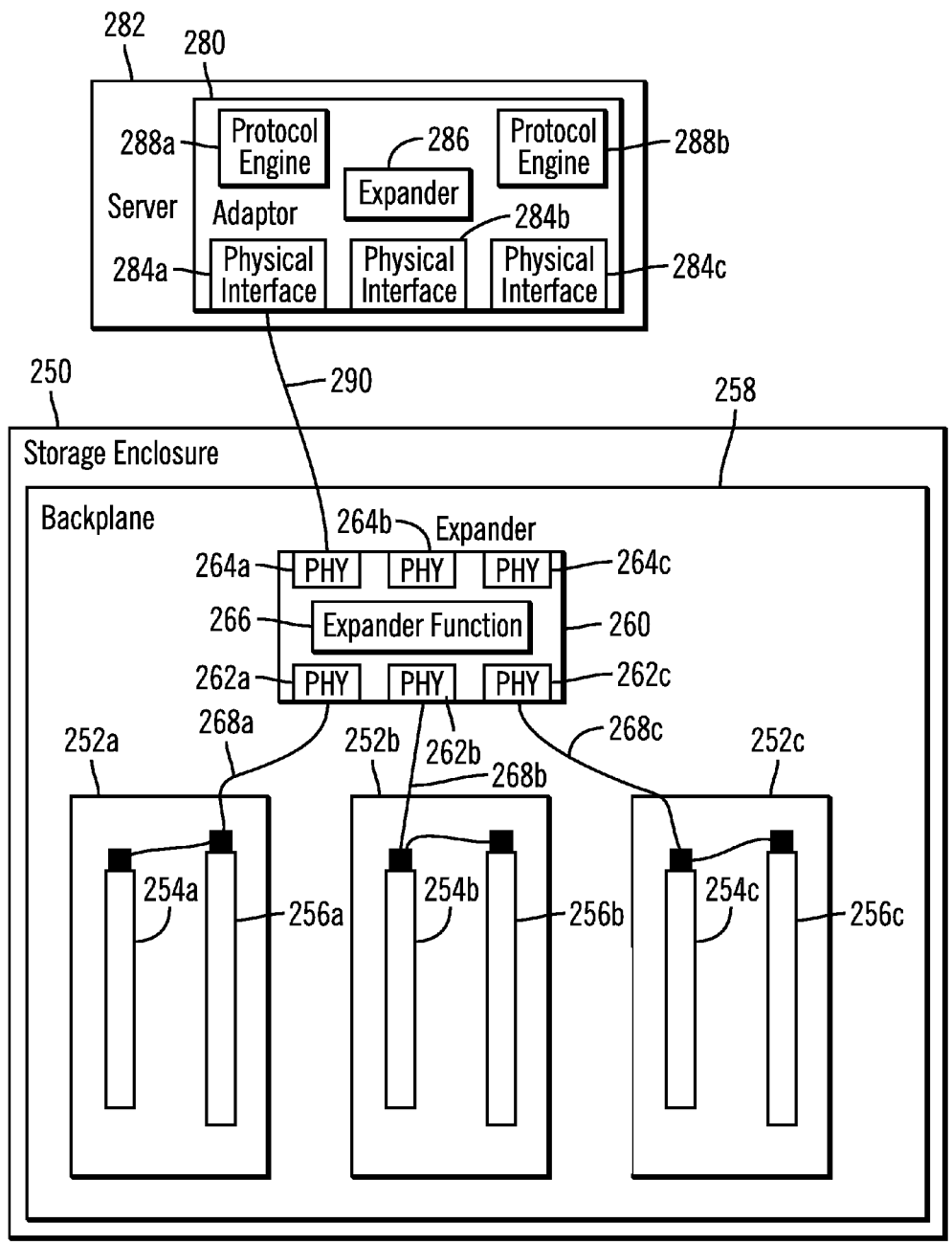
FIG. 7 illustrates a storage enclosure backplane and attached storage server in accordance with embodiments.

FIG. 7 illustrates an embodiment of the architecture of the backplane 258 of a storage enclosure 250, such as enclosure 200, having multiple slots 252a, 252b, 252c (three are shown, but more or fewer may be provided), where each slot has two physical interfaces 254a, 256a, 254b, 256b, 254c, 256c. The physical interfaces 254a, 254b, 254c and 256a, 256b, 256c may have different physical configurations, e.g., size dimensions and pin arrangements, to support different storage interconnect architectures, e.g., SATA/SAS and Fibre Channel. An expander 260 on the backplane 258 has multiple expander PHYs 262a, 262b, 262c. The expander PHYs 262a, 262b, 262c may be organized into one or more ports, where each port is assigned to have one or more PHYs. Further, one PHY 262a, 262b, 262c may be coupled to each pair of physical interfaces 254a, 256a, 254b, 256b, 254c, 256c in each slot 252a, 252b, 252c. An expander function 266 routes information from PHYs 262a, 262b, 262c to destination PHYs 264a, 264b, 264c from where the information is forwarded to an end device directly or through additional expanders. FIG. 7 shows the destination PHYs 264a, 264b, 264c connecting directly to the physical interfaces on an adaptor 280 in server 282.

In certain embodiments, a multidrop connector 266a, 266b, 266c extends from the physical interface for each PHY 262a, 262b, 262c to one of the slots 252a, 252b, 252c, where each end on the multidrop connector 266a, 266b, 266c is coupled to one of the interfaces 254a, 256a; 254b, 256b; and 254c, 256c, respectively, in the slots 252a, 252b, 252c, respectively. A multidrop connector comprises a communication line with multiple access points, where the access points may comprise cable access points, etched path access points, etc. In this way, one multidrop connector provides the physical connection to different physical interfaces in one slot, where the different physical interfaces may have different physical dimensions and pin arrangements. To accommodate different physical interfaces, the multidrop connector 268a, 268b, 268c terminators includes different physical connectors for mating with the different storage interconnect physical interfaces e.g., SAS/SATA, Fibre Channel, that may be on the storage unit 203, e.g., disk drive, inserted in the slot 252a, 252b, 252c and mated to physical interface 254a, 256a, 254b, 256b, 254c, 256c. The multidrop connectors 266a, 266b, 266c may comprise cables or paths etched on a printed circuit board.

Figure 8:
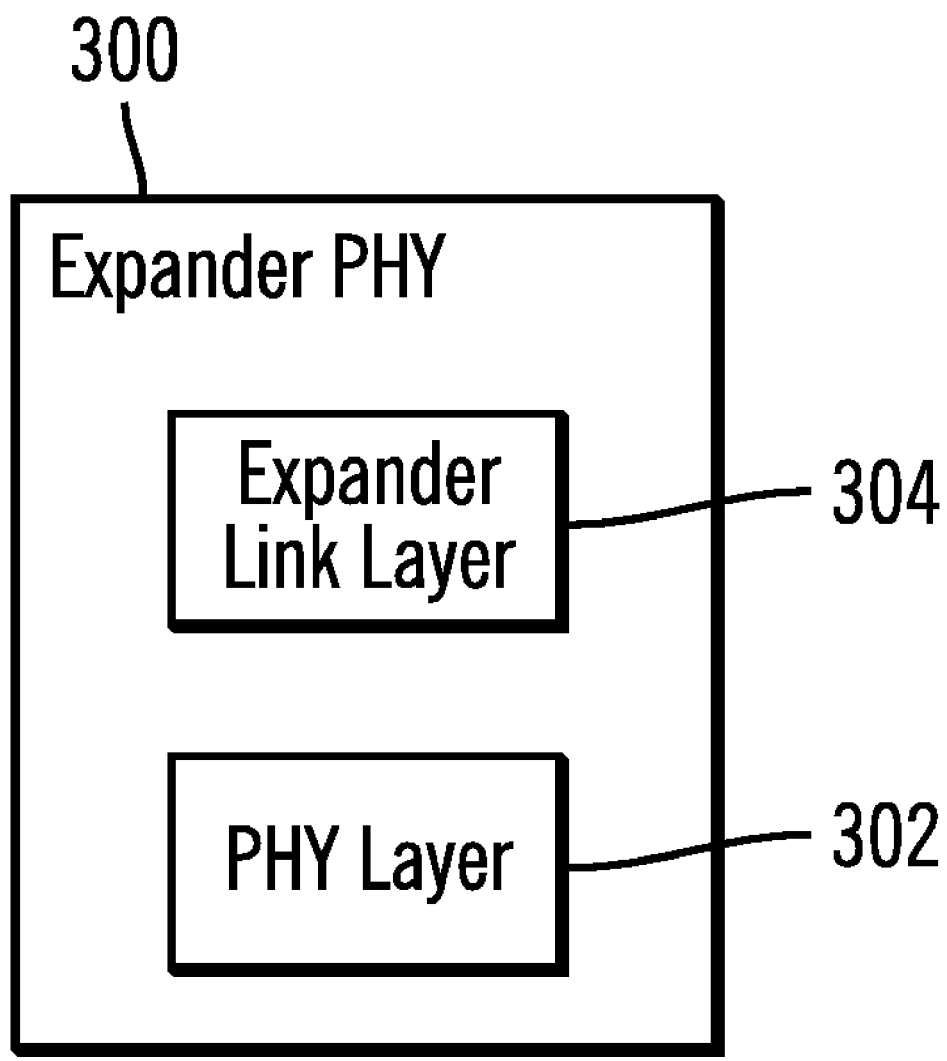
FIG. 8 illustrates an expander PHY in accordance with embodiments.

FIG. 8 illustrates components within an expander PHY 300, such as expander PHYs 262a, 262b, 262c, 264a, 264b, 264c. An expander PHY 300 may include a PHY layer 302 to perform PHY operations, and a PHY link layer 304. Additionally, the PHY layer 302 may perform the operations described with respect to the PHY layers 32a, 32b . . . 32n in FIG. 2 whose operations are described in FIG. 3. The expander PHY layer 302 may include the capability to detect transmission characteristics for different hardware interfaces, i.e., storage interconnect architectures, e.g., SAS/SATA, Fibre Channel, etc., and forward information on the storage hardware interface to the link layer 302, where the link layer 302 uses that information to access the address of the target storage device of the transmission to select the expander PHY connected to the target device. This architecture for the expander PHYs allows the expander to handle data transmitted from different storage interconnect architectures having different transmission characteristics.

The expander may further include a router to route a transmission from one PHY to another PHY connecting to the target device or path to the target device. The expander router may further maintain a router table that associates PHYs with the address of the devices to which they are attached, so a transmission received on one PHY directed to an end device is routed to the PHY associated with that end device.

With respect to FIG. 7, the adaptor 280 in the server 282 may include the same architecture as the adaptor 12 in FIG.

2, including the expander 34 and protocol engine 42a, 42b architecture that operates as described with respect to the embodiments of FIGS. 1, 2, 3, 4, and 5. The adaptor 280 receives data from the expander 260 in the storage enclosure 250 via connection 290 and then forward the transmission to one of the protocol engines 288a, 288b in the manner described above. Each physical interface 284a, 284b, 284c on the server adaptor 280 may connect to a different storage enclosure and each destination PHY 264a, 264b, 264 on the backplane 258 expander 260 may be coupled to a different server, thereby allowing different servers to connect to multiple storage enclosures and a storage enclosure to connect to different servers.

With the described embodiments, storage units, such as disk drives, having different connection interfaces may be inserted within the slots 252a, 252b, 252c (FIG. 7) on the backplane 258 by rotating the orientation of the storage unit assembly when inserting the storage unit in the slot. Further, the adaptor 280 may support transmissions from the backplane 258 expander 260 using different storage interconnect architectures, such as SAS/SATA and Fibre Channel, by including the components and performing the operations described above with respect to FIGS. 2, 3, 4, and 5. In this way, a single storage enclosure 250 may allow for use of storage units, such as disk drives, having different storage interfaces, i.e., storage interconnect architectures, with different physical interface arrangements, e.g., different dimensions and pin arrangements. The use of the adaptor 280 and expander 260 on the enclosure backplane both supporting storage interconnect architectures having different transmission characteristics, e.g., link speed and data format, allows for communication with an enclosure capable of including in its slots storage physical interfaces for different storage interconnect architectures, e.g., Fibre Channel, SAS/SATA.

Figure 9:
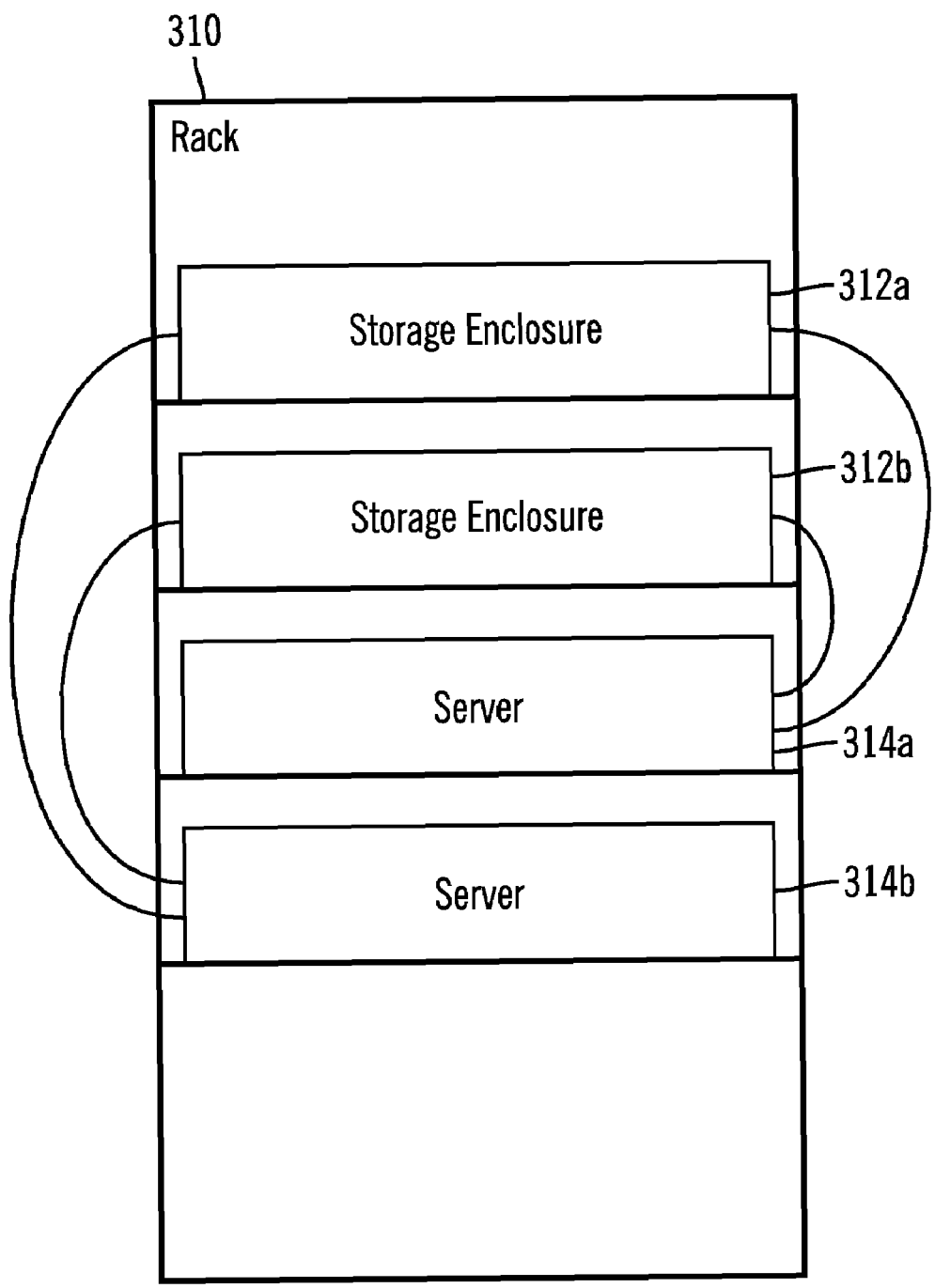
FIG. 9 illustrates a front view of a rack including storage enclosures and servers in accordance with embodiments.

FIG. 9 illustrates a storage rack 310 including mounted servers 312a, 312b and storage enclosures 314a, 314b. Only two of each are shown, but any number capable of being accommodated by the layout of the rack may be included. In this example, each server 312a, 312b is connected to each storage enclosure 314a, 314b. The storage enclosures 312a, 312b may include a backplane 258 as described with respect to FIGS. 6 and 7, and each server 312a, 312b may include an adaptor 280 as described with respect to FIGS. 2 and 7 to support storage units using different storage interconnect architectures that require different physical interfaces and have different transmission characteristics. Each storage enclosure and server may include multiple adaptor cards to allow for additional connections.

Figure 10:
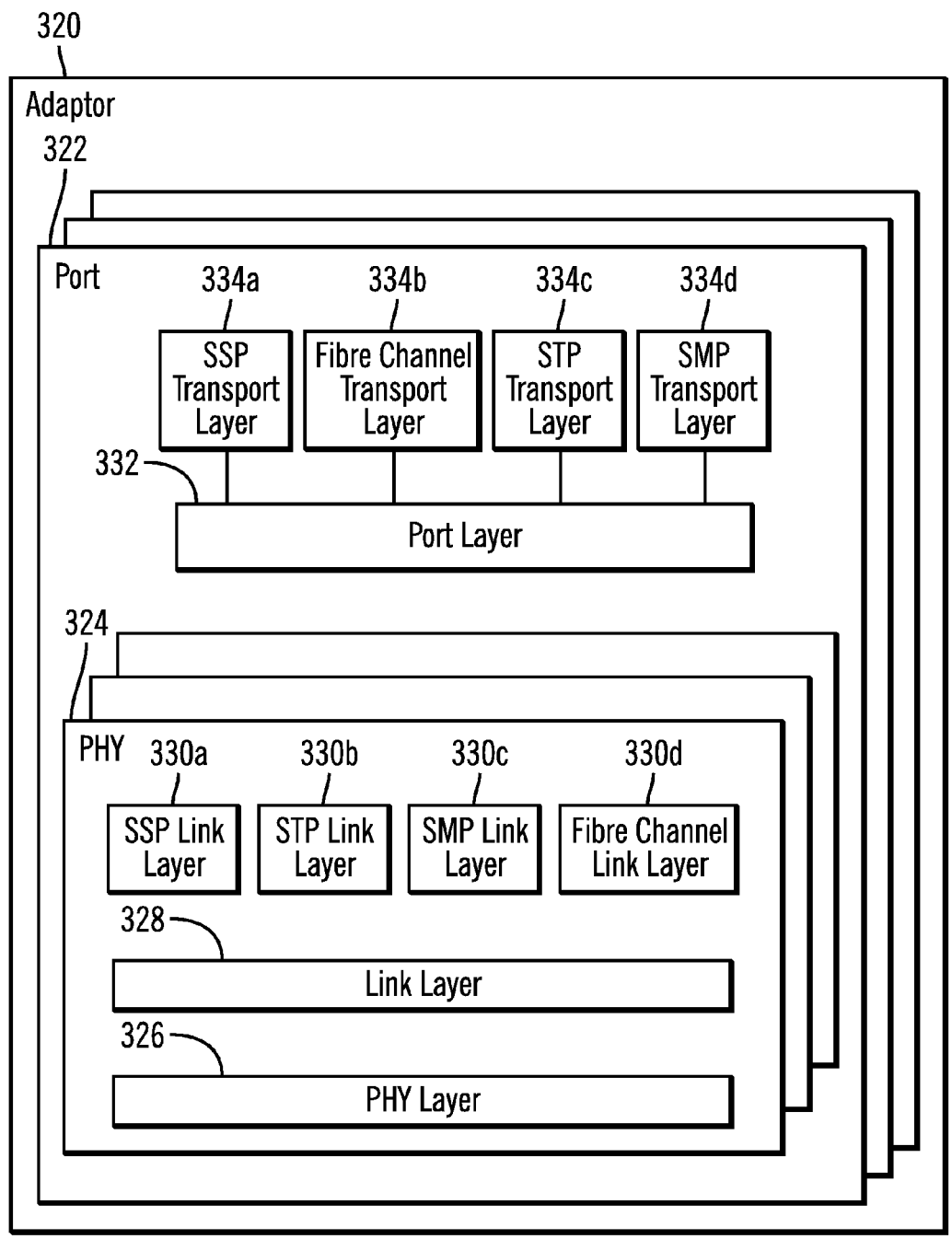
FIG. 10 illustrates an adaptor that may be used with the storage server in FIG. 7 in accordance with embodiments.

FIG. 10 illustrates an alternative embodiment of an adaptor 320 that may be substituted for the adaptor 280 in FIG. 7 connected to the storage enclosure 250. Adaptor 320 includes a plurality of ports 322, where each port includes one or more PHYs 324, and where each PHY 324 has a PHY layer 326, a link layer 328 and different protocol link layers, e.g., an SSP link layer 330a, STP link layer 330b, SMP link layer 330c, and a Fibre Channel Protocol link layer 330d. In a port 322, all the PHYs in that port share a link layer 332 and the transport layers, e.g., SSP transport layer 334a, Fibre Channel Protocol 334b, STP transport layer 334c, and SMP transport layer 334d. The PHY layer 326 and link layer 328 in the embodiment of FIG. 10 performs the operations of the PHY layers 32a, 32b . . . 32n and link layer 36 as described with respect to FIGS. 2, 3, 4, and 54 to detect the transmission characteristics and corresponding storage interconnect architecture therefrom and use the detected storage interconnect architecture to process the packet and determine the link layer protocol, e.g., SSP, STP, SMP, Fibre Channel Protocol to use. However, in the embodiment of FIG. 2, multiple PHY layers in multiple ports may share the link layer, port layer and transport layers, whereas in the embodiment of FIG. 10, each PHY has its own link layer and each port has its own port layer and transport layers, thereby providing greater redundancy of components. The STP protocol can also uses SATA.

Described embodiments provide architectures to allow a single adaptor interface to be used to interface with devices using different storage interfaces, i.e., storage interconnect architectures, where some of the storage interfaces use different and non-overlapping link speeds. This overcomes the situation where a single adaptor/controller, such a SAS device, may not support storage interconnect architectures that have different transmission characteristics, such as is the case where an adaptor supporting SAS/SATA may not support the Fibre Channel interface because such an adaptor cannot detect data transmitted using the Fibre Channel interface (storage interconnect architecture) and thus cannot load the necessary drivers in the operating system to support Fibre Channel.

Additional Embodiment Details

The described embodiments may be implemented as a method, apparatus or article of manufacture using programming and/or engineering techniques to produce software, firmware, hardware, or any combination thereof. The term "article of manufacture" and "circuitry" as used herein refers to a state machine, code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. When the code or logic is executed by a processor, the circuitry would include the medium including the code or logic as well as the processor that executes the code loaded from the medium. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration, and that the article of manufacture may comprise any information bearing medium known in the art.

Additionally, the expander, PHYs, and protocol engines may be implemented in one or more integrated circuits on the adaptor or on the motherboard.

In the described embodiments, layers were shown as operating within specific components, such as the expander and protocol engines. In alternative implementations, layers may be implemented in a manner different than shown. For instance, the link layer and link layer protocols may be implemented with the protocol engines or the port layer may be implemented in the expander.

In the described embodiments, the protocol engines each support multiple transport protocols. In alternative embodiments, the protocol engines may support different transport protocols, so the expander 40 would direct communications for a particular protocol to that protocol supporting the determined protocol.

In the described embodiments, transmitted information is received at an adaptor card from a remote device over a connection. In alternative embodiments, the transmitted and received information processed by the transport protocol layer or device driver may be received from a separate process executing in the same computer in which the device driver and transport protocol driver execute.

In certain implementations, the device driver and network adaptor embodiments may be included in a computer system including a storage controller, such as a SCSI, Redundant Array of Independent Disk (RAID), etc., controller, that manages access to a non-volatile or volatile storage device, such as a magnetic disk drive, tape media, optical disk, etc. In alternative implementations, the network adaptor embodiments may be included in a system that does not include a storage controller, such as certain hubs and switches.

In certain implementations, the adaptor may be configured to transmit data across a cable connected to a port on the adaptor. In further embodiments, the adaptor may be configured to transmit data across etched paths on a printed circuit board. Alternatively, the adaptor embodiments may be configured to transmit data over a wireless network or connection.

In described embodiments, the storage interfaces supported by the adaptors comprised SATA, SAS and Fibre Channel. In additional embodiments, other storage interfaces may be supported. Additionally, the adaptor was described as supporting certain transport protocols, e.g. SSP, Fibre Channel Protocol, STP, and SMP. In further implementations, the adaptor may support additional transport protocols used for transmissions with the supported storage interfaces. The supported storage interfaces may transmit using different transmission characteristics, e.g., different link speeds and different protocol information included with the transmission. Further, the physical interfaces may have different physical configurations, i.e., the arrangement and number of pins and other physical interconnectors, when the different supported storage interconnect architectures use different physical configurations.

The adaptor 12 may be implemented on a network card, such as a Peripheral Component Interconnect (PCI) card or some other I/O card, or on integrated circuit components mounted on a system motherboard or backplane.

In described embodiments, the interfaces in the slot extend along the vertical length of the slot and are in a parallel orientation with respect to each other. In alternative embodiments, the two interfaces may be oriented in different ways with respect to each other and the slot depending on the corresponding interface on the storage unit assembly. Further, in additional implementations more than two physical interfaces may be included in the slot for the different protocols supported by the adaptor.

The illustrated logic of FIGS. 3, 4, and 5 show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

Figure 11:
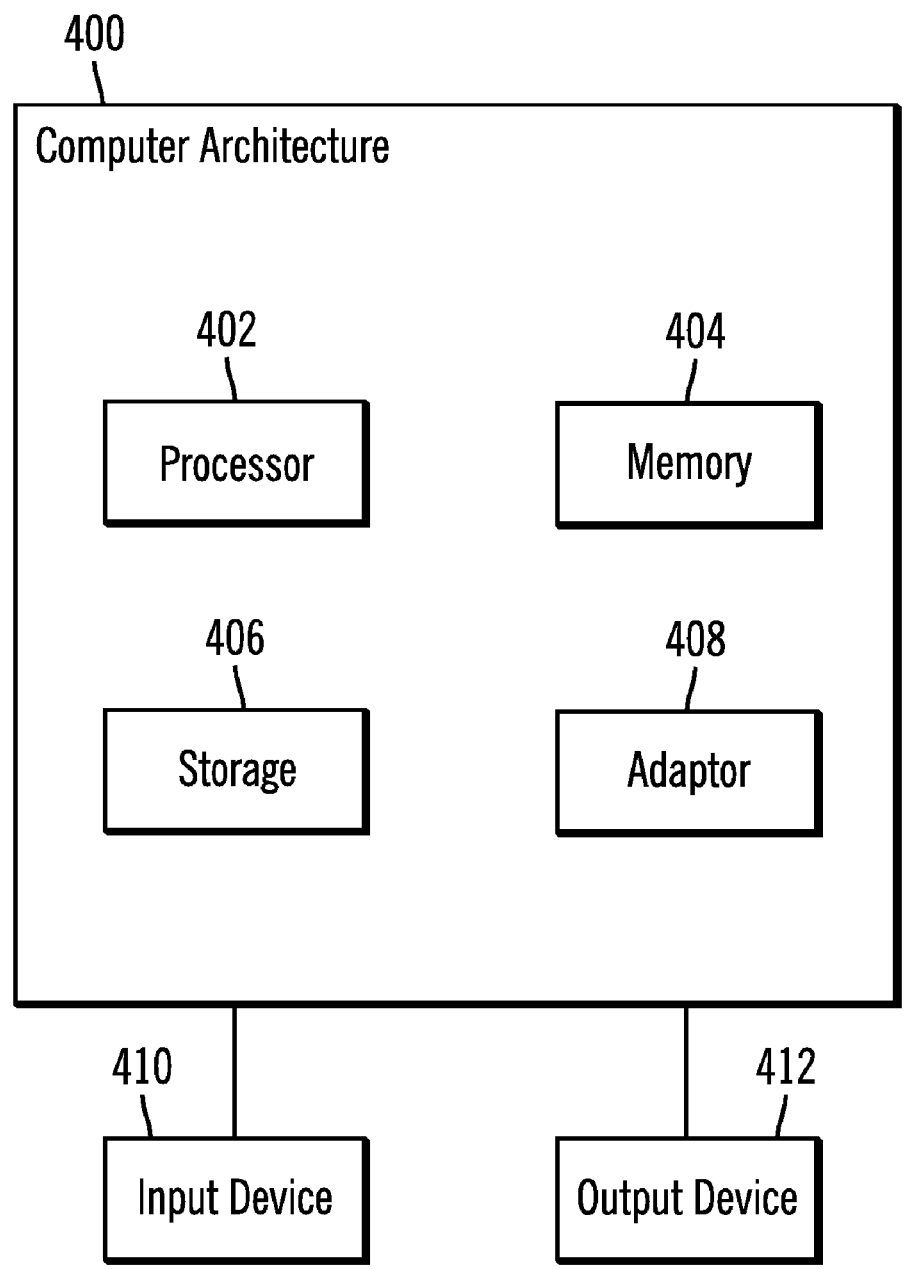
FIG. 11 illustrates system components that may be used with the described embodiments.

FIG. 11 illustrates one implementation of a computer architecture 400 of the storage enclosures and servers in FIGS. 6 and 8. The architecture 400 may include a processor 402 (e.g., a microprocessor), a memory 404 (e.g., a volatile memory device), and storage 406 (e.g., a non-volatile storage, such as magnetic disk drives, optical disk drives, a tape drive, etc.). The storage 406 may comprise an internal storage device or an attached or network accessible storage. Programs in the storage 406 are loaded into the memory 404 and executed by the processor 402 in a manner known in the art. The architecture further includes an adaptor as described above with respect to FIGS. 1-7 to enable a point-to-point connection with an end device, such as a disk drive assembly. As discussed, certain of the devices may have multiple network cards. An input device 410 is used to provide user input to the processor 402, and may include a keyboard, mouse, pen-stylus, microphone, touch sensitive display screen, or any other activation or input mechanism known in the art. An output device 412 is capable of rendering information transmitted from the processor 402, or other component, such as a display monitor, printer, storage, etc.

The foregoing description of various embodiments has been presented for the purposes of illustration and description. It is not intended to be exhaustive or to limit the embodiments to the precise form disclosed. Many modifications and variations are possible in light of the above teaching

What is claimed is:

1. An article of manufacture comprising code implemented in an expander for interfacing storage units with an external device coupled to the expander through a first physical interface or a second physical interface, wherein the storage units are inserted in slots in a storage enclosure, wherein the code causes operations to be performed, the operations comprising:

communicating with one storage unit interfacing with the first physical interface when the storage unit is received in a first orientation with respect to one slot; and communicating with one storage unit interfacing with the second physical interface when the storage unit is received in a second orientation with respect to the slot, wherein the first and second physical interface supports different storage interconnect architectures, receiving a transmission from one storage unit in one slot coupled to the expander;

maintaining information on storage interconnect architectures and transmission characteristics used for the storage interconnect architectures, wherein the storage interconnect architectures have transmission characteristics;

determining the transmission characteristic of the received transmission;

determining from the information the storage interconnect architecture associated with the determined transmission characteristics;

using the information on the determined storage interconnect architecture to process the transmission and determine a transport layer for the received transmission, wherein there is one transport layer for each supported transport protocol; and forwarding the transmission to the determined transport layer.

2. The article of manufacture of claim 1, wherein the different storage interconnect architectures supported by the physical interfaces have different transmission characteristics.

3. The article of manufacture of claim 1, wherein the two physical interfaces in the slots have different physical configurations.

4. The article of manufacture of claim 1, wherein the supported storage interconnect architectures comprise SATA, SAS, and Fibre Channel and wherein the supported transport protocols comprise SSP, Fibre Channel Protocol, STP, SMP, and SATA.

5. The article of manufacture of claim 1, wherein the article of manufacture stores instructions that when executed result in performance of the operations.

* * * * *